(12) United States Patent
Li et al.

(10) Patent No.: US 11,938,416 B2
(45) Date of Patent: Mar. 26, 2024

(54) POLYETHER POLYOL REFINING METHOD AND REFINING APPARATUS

(71) Applicants: JIAHUA CHEMISTRY (BINZHOU) CO., LTD., Shandong (CN); JIAHUA CHEMICALS (SHANGHAI) LTD., Shanghai (CN)

(72) Inventors: Zhijun Li, Shanghai (CN); Cheng Wu, Shanghai (CN); Yumin Zhang, Shanghai (CN); Yubo Li, Shanghai (CN)

(73) Assignees: Jiahua Chemistry (Binzhou) Co., Ltd., Shandong (CN); Jiahua Chemicals (Shanghai) Ltd., Shanghai (CN)

( * ) Notice: Subject to any disclaimer, the term of this patent is extended or adjusted under 35 U.S.C. 154(b) by 194 days.

(21) Appl. No.: 16/982,796

(22) PCT Filed: Nov. 1, 2019

(86) PCT No.: PCT/CN2019/114942
§ 371 (c)(1),
(2) Date: Sep. 21, 2020

(87) PCT Pub. No.: WO2020/088632
PCT Pub. Date: May 7, 2020

(65) Prior Publication Data
US 2021/0275941 A1 Sep. 9, 2021

(30) Foreign Application Priority Data
Nov. 2, 2018 (CN) .......................... 201811306363.2

(51) Int. Cl.
*B01D 11/04* (2006.01)
*B01D 17/04* (2006.01)

(52) U.S. Cl.
CPC ...... *B01D 11/0449* (2013.01); *B01D 11/0457* (2013.01); *B01D 11/0492* (2013.01); *B01D 17/045* (2013.01)

(58) Field of Classification Search
CPC ............ B01D 11/0449; B01D 11/0492; B01D 17/045
See application file for complete search history.

(56) References Cited

U.S. PATENT DOCUMENTS

| | | | |
|---|---|---|---|
| 5,410,093 | A | 4/1995 | Dorai |
| 5,449,841 | A | 9/1995 | Goegebeur |
| 6,376,625 | B1 | 4/2002 | Cosman et al. |
| 6,458,920 | B1 | 10/2002 | Baxendell et al. |
| 9,040,754 | B2 | 5/2015 | Osborne et al. |

FOREIGN PATENT DOCUMENTS

| | | |
|---|---|---|
| CA | 2165140 | 7/1996 |
| CN | 1324375 | 11/2001 |
| CN | 102336902 | 2/2012 |
| CN | 108239277 | 7/2018 |
| CN | 108239277 A | 7/2018 |
| CN | 108341941 | 7/2018 |
| CN | 108341941 A | 7/2018 |
| CN | 108341942 | 7/2018 |
| CN | 108341942 A | 7/2018 |
| CN | 209338440 U | 9/2019 |
| EP | 0038986 A2 | 4/1981 |
| EP | 0 038 986 A2 | 11/1981 |
| IN | 109575268 | 4/2019 |
| JP | 56104936 | 8/1981 |
| WO | 96/20972 A2 | 7/1996 |
| WO | 1996/020972 A2 | 11/1996 |

OTHER PUBLICATIONS

PCT International Search Report, issued in connection to patent application No. PCT/CN2019/114942; dated Feb. 6, 2020; 5 pages; China.
PCT Written Opinon of the International Searching Authority, issued in connection to patent application No. PCT/CN2019/114942; dated Feb. 6, 2020; 8 pages; China.
Chinese Patent Office; Notification of First Office Action, issued in connection to patent application No. 2018113063632; dated Feb. 3, 2020; 16 pages; China.
Chinese Patent Office; Notification of Second Office Action, issued in connection to patent application No. 2018113063632; dated Nov. 6, 2020; 18 pages; China.
Deng, Dehua et al.; Materials of Civil Engineering; Sep. 30, 2010; 15 pages; China Railway Publishing House; Beijing, China.
"PhaseSep Coalescer", Pall Corporation, Mar. 1, 2017; <<https://shop.pall.com/INTERSHOP/web/WFS/PALL-PALLUS-Site/en_US/-/USD/ViewProductAttachment-OpenFile?LocaleId=&DirectoryPath=pdfs%2FFuels-and-Chemicals&FileName=FCPHASENa.pdf&UnitName=PALL>>.

(Continued)

*Primary Examiner* — Sikarl A Witherspoon
(74) *Attorney, Agent, or Firm* — GREENBERG TRAURIG, LLP (57) ABSTRACT

Disclosed in the present invention is a polyether polyol refining method, comprising (1) neutralising or diluting crude polyether polyol to obtain a mixed solution; (2) flowing the mixed solution through a hydrophilic medium to aggregate same into a first density phase liquid and a second density phase liquid, the first density phase liquid being an aqueous solution containing alkaline metal ions and/or alkaline earth metal ions, and the second density phase liquid being polyether polyol; and (3) allowing the first density phase liquid to settle and separating same from the second density phase liquid to obtain refined polyether polyol. In the present refining method, using the hydrophilic medium for one-step removal of the alkaline ions and water in the polyether polyol simplifies the treatment steps, increases treatment efficiency, and can prevent polyether polyol loss; the obtained polyether polyol has low alkaline ion content and little odour. Also disclosed in the present invention is a polyether polyol refining apparatus, comprising a mixing unit and a separating unit, and being capable of refining polyether polyol with low alkaline ion content and little odour.

8 Claims, 3 Drawing Sheets

(56) References Cited

OTHER PUBLICATIONS

European Search Report from European Patent Application No. 19879882.9 dated Feb. 23, 2021.
Pall Corporation, "PhaseSep Coalescer"; Data Sheet FCPHASESENa; Mar. 1, 2017.

POLYETHER POLYOL REFINING METHOD AND REFINING APPARATUS

CROSS-REFERENCE TO RELATED APPLICATIONS

This application is the U.S. National Phase of International Application No. PCT/CN2019/114942, filed Nov. 1, 2019, which claims the benefit of Chinese Application No. 201811306363.2, filed Nov. 2, 2018, both of which are incorporated by reference herein their entirety.

TECHNICAL FIELD

The invention belongs to the technical field of chemical synthesis, and particularly relates to a method for refining polyether polyol and an apparatus thereof.

BACKGROUND OF THE INVENTION

Polyether polyol is one of the main raw materials for synthesis of polyurethane. Hydroxyl groups of the polyether polyol can react with polyisocyanate to produce polyurethane products such as foam plastic, synthetic rubber, paint, adhesive, synthetic leather, chemical fiber and the like. In addition, polyether polyols can also be used as nonionic surfactants, lubricants, liquid fluids, heat exchange fluids, and the like. Polyether polyol has rapid development and can be widely applied to various fields of national economy. The synthesis of polyether polyol is usually carried out by ring-opening polymerization of epoxides such as ethylene oxide, propylene oxide and the like in an initiator containing an active hydrogen compound in the presence of alkali metal, alkaline earth metal or hydroxides thereof as catalyst.

Basic metal ions are easily mixed in the crude polyether polyol obtained after polymerization. When the polyether polyol is reacted with isocyanate to produce polyurethane, the reaction would be severe and the polyurethane product would be unqualified due to caking if the content of metal ions such as potassium, sodium and the like mixed in the polyether polyol is high. Therefore, the crude polyether polyol needs to be subjected to refining treatment to remove metal ions such as potassium, sodium and the like.

At present, the refining of polyether polyol is mainly carried out with neutralization-filtration method. Firstly, an acidic neutralizing reagent is added to a crude polyether polyol to neutralize alkaline metal ions in the crude polyether, producing alkali metal salts. Then, vacuum dehydration is carried out, and alkali metal salts crystallize and precipitate. Finally, solid alkali metal salts are removed through filtration to obtain a refined polyether polyol product. However, such refining process is complex in operation, and in order to improve the filtering effect of the alkali metal salts, long dehydration time is needed to improve the crystal particle size. Due to the large viscosity of the polyether polyol, polyether polyol loss is easily caused in the filtering process. Therefore, the existing method for refining polyether polyol has the problems of complex processing steps, long treatment time, low yield and the like.

SUMMARY OF THE INVENTION

Therefore, the technical problem to be solved by the invention is to overcome the defects that the process steps are complex, the treatment time is long, and the yield of the polyether polyol is damaged in the refining process of the crude polyether polyol in the prior art.

For this purpose, the invention provides the following technical solutions:

In a first aspect, the invention provides a refining method for polyether polyol, comprising the following steps:
(1) neutralizing or diluting crude polyether polyol to obtain a mixed solution containing the crude polyether polyol;
(2) flowing the mixed solution through a hydrophilic medium to aggregate same into a first density phase liquid and a second density phase liquid, the first density phase liquid being an aqueous solution containing alkaline metal ions and/or alkaline earth metal ions, and the second density phase liquid being polyether polyol; and
(3) allowing the first density phase liquid to settle and separating same from the second density phase liquid to obtain refined polyether polyol.

Optionally, in the refining method of the present invention, the hydrophilic medium comprises at least one group selected from a hydroxyl group, an amide group, an amino group and a carboxyl group.

Further optionally, in the refining method of the present invention, the hydrophilic medium is glass fiber and/or polymer fiber.

Optionally, in the refining method of the present invention, said neutralizing or diluting crude polyether polyol in the step (1) comprises mixing the crude polyether polyol with an acid solution having a concentration of 0-75 wt %.

Further optionally, in the refining method of the present invention, the acid solution is an aqueous solution comprising at least one of phosphoric acid, hydrochloric acid, nitric acid, sulfuric acid, acetic acid, citric acid and salicylic acid; preferably, the acid solution is an aqueous solution comprising phosphoric acid.

Optionally, in the refining method of the present invention, in the step (2), the mixed solution flows through the hydrophilic medium at a pressure of 0.1-2 MPa and a temperature of 50-180° C., preferably at a temperature of 60-120° C.

In a second aspect, the invention provides a refining apparatus for polyether polyol, comprising:
a mixing unit, provided with a mixing inner cavity and at least two sample inlets and at least one sample outlet, the mixing inner cavity communicating with the outside through said at least two sample inlets and at least one sample outlet; and
a separating unit, comprising at least one salt removal device communicating with the sample outlet, wherein the salt removal device is provided with
a separation inner cavity,
a first density phase outlet and a second density phase outlet which communicatively connect the separation inner cavity with the outside, the second density phase outlet being located above the first density phase outlet, and
a mixed solution inlet arranged to avoid the first density phase outlet and the second density phase outlet and being communicated with the sample outlet of the mixing unit,
wherein a sample feeding assembly and a separation assembly are arranged inside the separation inner cavity, the sample feeding assembly being connected with the mixed solution inlet, and the separation assembly being connected with the sample feeding assembly,
wherein the separation assembly comprises at least two separation elements arranged in parallel and extending in the flow direction of the mixed solution, each of the separation elements comprising a circulation cavity for circulating the mixed solution and a hydrophilic medium filled in the circulation cavity; and wherein the sample feeding assembly is capable of splitting the mixed solution into equal parts flowing into said at least two separation elements.

Optionally, in the refining apparatus of the present invention, the first density phase outlet is formed on the bottom wall of the salt removal device, the second density phase outlet is formed on the top wall of the salt removal device, and the mixed solution inlet is formed on a vertical side wall of the salt removal device;

or wherein the first density phase outlet is formed on a vertical side wall of the salt removal device, the second density phase outlet is formed on the top wall of the salt removal device, and the mixed solution inlet is formed on the bottom wall of the salt removal device.

Optionally, the refining apparatus of the present invention further comprises a pressurizing unit, arranged on a pipeline which communicatively connects the mixing unit and the separating unit.

Further optionally, in the refining apparatus of the present invention, the pressurizing unit is provided with an input end and an output end, the pipeline penetrates into the pressurizing unit from the input end and penetrates out of the output end, the pipeline adjacent to the input end is communicated with the mixing unit, and the pipeline adjacent to the output end is communicated with the separating unit.

Optionally, the pressurizing unit is a pressurizing pump.

Optionally, said at least two sample inlets of the mixing unit are arranged adjacently, and said at least one sample outlet is arranged at one end far away from the sample inlet, of the mixing unit.

Optionally, said at least two sample inlets of the mixing unit comprise a first fluid sample inlet and a second fluid sample inlet, and wherein the first fluid is a crude polyether polyol and the second fluid is an acid solution or water.

Optionally, the mixing unit is selected from a neutralization kettle or a pipeline mixer.

Optionally, the separation element is in a sheet or tubular shape.

Optionally, the hydrophilic medium comprises at least one group selected from a hydroxyl group, an amide group, an amino group and a carboxyl group.

Further optionally, the hydrophilic medium is glass fiber and/or polymer fiber.

Optionally, the sample feeding assembly comprises at least two sample feeding tubes arranged in one-to-one correspondence with said at least two separation elements, and one end, away from the separation element, of the sample feeding tube is connected with the mixed solution inlet.

Optionally, the salt removal device is operated at a temperature of 50-180° C. and a pressure of 0.1-2 MPa; preferably at a temperature of 60-120° C.

Optionally, the refining method is carried out using the refining apparatus as described above.

Compared with the prior art, the present invention has the following advantages:

1. According to the refining method for polyether polyol of the present invention, the crude polyether polyol is firstly neutralized or diluted, so that residual catalysts (alkali metal ions and/or alkaline earth metal ions) in the crude polyether polyol are dissolved in water and dispersed in the form of droplets in the polyether polyol, obtaining a mixed solution containing the crude polyether polyol.

The mixed solution is then flowed through a hydrophilic medium. Due to the hydrophilicity of the medium, polyether polyol in the mixed solution flows out first after flowing through the hydrophilic medium and is aggregated into a second density phase liquid. The aqueous phase droplets in the mixed solution are contacted with the hydrophilic medium and adsorbed on the surface of the hydrophilic medium and continuously aggregate on the surface of the hydrophilic medium along with circulation of the mixed solution, and after a certain volume is reached, the aqueous phase droplets are separated from the hydrophilic medium under the action of gravity, so as to form a first density phase liquid. Since alkali metal ions and/or alkaline earth metal ions are dissolved in the first density phase liquid, the density of the first density phase liquid is greater than that of the second density phase liquid, so after settling for a period of time, the first density phase liquid is converged below the second density phase liquid, realizing separation of the first density phase liquid from the second density phase liquid and obtaining a refined polyether polyol.

According to the refining method for polyether polyol of the present invention, after the polyether polyol is neutralized or diluted, only one step is needed to separate the residual alkali metal catalyst, alkaline earth metal catalyst and water mixed in the polyether polyol to obtain the refined polyether polyol. No additional adsorption or filtration step is required in the refining method for polyether polyol, and no waste residues are generated in the refining process. The refining process for the polyether polyol is simplified, the operation efficiency is improved, the treatment cost is reduced, and the loss of polyether polyol in the refining process can be avoided. Alkali metal and alkaline earth metal ions in the polyether polyol are effectively removed, so the polyether polyol product obtained by the refining method of the present invention can be directly used for synthesis of polyurethane products, and side reactions in the synthesis process of the polyurethane products can be reduced, and the quality of the synthesized polyurethane products can be improved.

In the refining process of polyether polyol, residual epoxy compounds and aldehyde gas generated in the polyether polyol synthesis process are dissolved in water and separated along with the first density phase liquid from the polyether polyol, so the obtained polyether polyol has a low total aldehyde content (≤3 ppm) and little odor, and is highly environmental friendly.

2. According to the refining method of the present invention, the hydrophilic medium contains at least one group selected from a hydroxyl group, an amide group, an amino group and a carboxyl group. These groups are polar groups, so the hydrophilic medium has high water affinity and can effectively adsorb aqueous phase droplets in the mixed solution.

3. According to the refining method of the present invention, said neutralizing or diluting treatment is carried out by mixing the crude polyether polyol with an acid solution having a concentration of 0-75 wt %. It is found that when the acid solution has a concentration in the range of 0 wt % to 75 wt %, good neutralization effect can be achieved, which is favorable for controlling the acid value of the polyether polyol and fully dissolving the alkali metal and the alkaline earth metal catalysts in the polyether polyol.

The acid solution is preferably an aqueous solution comprising phosphoric acid. Phosphoric acid has moderate acidity, so equipment corrosion can be avoided and the polyether polyol quality is improved. In addition, the phosphoric acid has good water solubility and can be favorably separated along with the first density phase liquid from the polyether polyol.

4. According to the refining method of the present invention, the pressure is controlled to be 0.1-2 MPa and the temperature is controlled to be 50-180° C. for carrying out the aggregation and separation steps of the first density phase liquid and the second density phase liquid. The selected pressure and temperature are favorable for controlling the solubility of alkali metal ions and/or alkaline earth metal ions in an aqueous solution, allowing the concentration of alkali metal ions and/or alkaline earth metal ions in the first density phase liquid is lower than a saturation value of the alkali metal ions and/or alkaline earth metal ions in the aqueous solution, so that the separation effect of alkali metal ions and/or alkaline earth metal ions in the polyether polyol is improved.

5. The refining apparatus of the polyether polyol comprises a mixing unit and a separating unit. The mixing unit is provided with a mixing inner cavity, and at least two sample inlets and at least one sample outlet which communicatively connect the mixing inner cavity with the outside. The crude polyether polyol and the acid solution or water flow into the mixing inner cavity through different sample inlets, and are neutralized or diluted in the mixing inner cavity, and the formed mixed solution flows out of the mixing unit through the sample outlet.

The separating unit comprises at least one salt removal device in communication with the sample outlet of the mixing unit. The mixed solution flows out of the mixing unit from the sample outlet, and flows into a separation inner cavity through a mixed solution inlet of the salt removal device, and the refining process of the polyether polyol is completed in the separation inner cavity. Preferably, the mixed solution firstly flows into a sample feeding assembly connected with the mixed solution inlet, and is split into equal parts flowing into at least two separation elements of a separation assembly. The separation elements are arranged in parallel and extending in the flow direction of the mixed solution. During the circulating process of the mixed solution in a circulation cavity of the separation elements, the mixed solution flows through the hydrophilic medium, and due to the hydrophilicity of the hydrophilic medium, the polyether polyol in the mixed solution flows out first after flowing through the hydrophilic medium and is gathered to form a second density phase liquid; The aqueous phase droplets in the mixed solution are contacted with the hydrophilic medium and adsorbed on the surface of the hydrophilic medium and continuously gather on the surface of the hydrophilic medium along with circulation of the mixed solution. After a certain volume is reached, the aqueous phase droplets are separated from the hydrophilic medium under the action of gravity, and aggregate to form the first density phase liquid.

Since alkali metal ions and/or alkaline earth metal ions are dissolved in the first density phase liquid, the density of the first density phase liquid is greater than that of the second density phase liquid, so after settling for a period of time, the first density phase liquid is converged below the second density phase liquid and flows out of the separation inner cavity through a first density phase outlet, and the second density phase liquid which has a smaller density flows out of the separation inner cavity through a second density phase outlet arranged above the first density phase outlet, obtaining the refined polyether polyol.

According to the refining apparatus for polyether polyol of the present invention, residual alkali metal and alkaline earth metal ions in the polyether polyol can be effectively separated and excess water in the polyether polyol is removed without filtration, dehydration, adsorption and the like, obtaining a refined polyether polyol which has a low total aldehyde content (≤3 ppm) and little odor and is highly environmental friendly. With the refining apparatus of the present invention, the refining treatment of the polyether polyol can be realized in one step, so the treatment process is simplified, the treatment efficiency is improved, and the loss of polyether polyol can be effectively avoided. The prepared polyether polyol can be directly used for synthesizing polyurethane products, and side reactions in the synthesis process of the polyurethane products can be reduced, and the quality of the synthesized polyurethane products is improved.

6. According to the refining apparatus of the present invention, the first density phase outlet is formed on the bottom wall of the salt removal device, and the second density phase outlet is formed on the top wall of the salt removal device; or, the first density phase outlet is formed on a vertical side wall of the salt removal device, and the second density phase outlet is formed on the top wall of the salt removal device. That is, the second density phase outlet is located above the first density phase outlet, ie, the density difference between the second density phase liquid and the first density phase liquid can be utilized, so that the two liquids flow out of the salt removal device via different outlets, and the refining process is completed.

7. The refining apparatus further comprises a pressurizing unit arranged on a pipeline which communicatively connects the mixing unit and the separating unit. The pressurizing unit is used for pumping the mixed solution in the mixing unit into the separating unit and maintaining a constant pressure in the separating unit so as to complete the refining process of the polyether polyol in the separation inner cavity of the salt removal device.

8. According to the refining apparatus of the present invention, the sample feeding assembly comprises at least two sample feeding tubes arranged in one-to-one correspondence with said at least two separation elements, and one end, away from the separation element, of the sample feeding tube is connected with the mixed solution inlet. When the mixed solution flows into the sample feeding assembly through the mixed solution inlet, the mixed solution is firstly uniformly distributed into each of the sample feeding tubes, and then flows through the sample feeding tubes to reach the separation elements connected with the sample feeding tubes in an one-to-one correspondence manner. By means of the sample feeding assembly, the mixed solution can be divided into equal parts, and each part flows into one corresponding separation element where the separation process of the first density phase liquid and the second density phase liquid are performed. By controlling the flow volume, the liquid separation efficiency is favorably improved, and then the refining effect of the polyether polyol is improved.

BRIEF DESCRIPTION OF THE DRAWINGS

In order to more clearly illustrate the technical solutions of the embodiments of the present invention or the prior art, reference will now be made to the accompanying drawings, which are to be used in the detailed description or the prior art, in which.

REFERENCE NUMBERS

1—mixing unit; 11—first fluid sample inlet; 12—second fluid sample inlet; 13—mixing inner cavity; 14—sample outlet; 15—gas feed inlet; 2—separating unit; 21—mixed solution inlet; 22—second density phase outlet; 23—first density phase outlet; 24—separation inner cavity; 25—sample feeding assembly; 26—separation assembly; 3—pressurizing unit; and 4—pipeline.

DETAILED EMBODIMENTS

The technical solutions of the present invention will be described more clearly and fully hereinafter with reference to the accompanying drawings. The described embodiments are part of the embodiments of the invention and not all embodiments. Based on the embodiments of the present invention, all other embodiments obtained by one of ordinary skill in the art without creative work are within the scope of protection of the present invention.

In the description of the invention, it should be noted that, the terms indicating the orientation or positional relationship, such as "center", "top", "bottom", "left", "right", "vertical", "horizontal", "inner", "outside", etc., are based on the orientation or positional relationship shown in the figures, and are merely for ease of description of the present invention, but are not intended to indicate or imply that the indicated device or element must have a particular orientation, constructed and operated in a particular orientation, and therefore not to be construed as a limitation of the present invention. In addition, the terms "first", "second" are "third" are used for descriptive purposes only and are not to be construed as indicating or implying relative importance.

In the description of the invention, unless otherwise specified, it should be understood that the terms "mounted", "connection", "connected" are to be construed broadly, for example, may be a fixed connection, a detachable connection or an integrated connection; may be mechanical connection or electrical connection; may be direct connection, may also be indirect connection by an intermediate medium, or may be in communication with the interior of two elements. The specific meanings of the above-mentioned terms in the present invention can be understood by one of ordinary skill in the art.

In addition, the technical features involved in the various embodiments of the invention described below can be combined with each other as long as there is no conflict between each other.

Experimental steps or conditions not noted in the examples can be carried out according to the operation or the condition of the conventional experimental steps described in the art. The used reagents or instruments, for which the manufacturers are not noted, are all conventional reagent products which can be commercially available.

Embodiment 1

Figure 1:
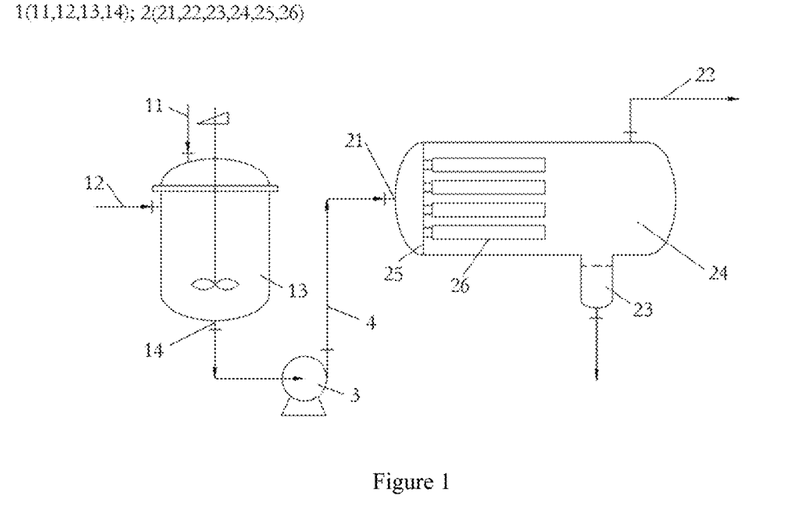
FIG. 1 is a schematic structural diagram of a refining apparatus of polyether polyol provided in a first embodiment of the present invention.

Provided is a refining apparatus for polyether polyol, comprising a mixing unit 1, a pressurizing unit 3 and a separating unit 2, wherein the pressurizing unit 3 is located on a pipeline 4 which communicatively connects the mixing unit 1 with the separating unit 2.

The mixing unit 1 has a mixing inner cavity 13, and two sample inlets and one sample outlet 14 which communicatively connect the mixing inner cavity 13 with the outside. As shown in FIG. 1, the mixing unit 1 is a neutralization kettle. One of the two sample inlets is a first fluid sample inlet 11 arranged on the vertical side wall of the neutralization kettle, and the other of the two sample inlets is a second fluid sample inlet 12 arranged on the top wall of the neutralization kettle. The sample outlet 14 is formed in the bottom wall of the neutralization kettle.

The sample outlet 14 of the mixing unit 1 is communicated with the pressurizing unit 3, such as a pressurizing pump, through the pipeline 4. The pressurizing pump is provided with an input end and an output end, and the pipeline 4 penetrates into the pressurizing pump from the input end and penetrates out through the output end. The pipeline 4, adjacent to the input end, is communicated with the mixing unit 1, and the pipeline 4, adjacent to the output end, is communicated with the separating unit 2. The pressurizing pump is installed on the pipeline 4, and is capable of increasing the pressure of the liquid in the pipeline 4 so as to transport the mixed solution from the mixing unit 1 to the separating unit 2.

The separating unit 2 comprises one salt removal device which is communicated with the sample outlet 14 of the mixing unit 1. The salt removal device has a separation inner cavity 24, a first density phase outlet 23 and a second density phase outlet 22 which communicatively connect the separation inner cavity 24 with the outside, and a mixed solution inlet 21 arranged to avoid the first density phase outlet 23 and the second density phase outlet 22. As shown in FIG. 1, the mixed solution inlet 21 is formed on the vertical side wall of the salt removal device, the first density phase outlet 23 is formed in the bottom wall of the salt removal device, and the second density phase inlet is formed in the top wall of the salt removal device. The pipeline 4 which communicatively connects the neutralization kettle with the salt removal device penetrates out of the output end of the pressurizing pump and connects to the mixed solution inlet 21 of the salt removal device.

The separation inner cavity 24 is internally provided with a sample feeding assembly 25 and a separation assembly 26. The sample feeding assembly 25 connects the mixed solution inlet 21 with the separation assembly 26. As shown in FIG. 1, the separation assembly 26 comprises four tubular separation elements arranged in parallel and extending in the flow direction of the mixed solution. One end of the sample feeding assembly 25 is connected with the four separation elements, and the other end of the sample feeding assembly 25 is connected with the mixed solution inlet 21. The sample feeding assembly 25 is internally provided with four sample feeding tubes which are in one-to-one correspondence with the four separation elements. One end of each of the sample feeding tube is connected with one of the tubular separation elements, and the other end (away from the separation elements) of each of the sample feeding tubes is connected to the mixed solution inlet 21. The mixed solution coming from the mixed solution inlet 21 firstly flows into the sample feeding assembly 25 and is evenly distributed into each tube, and then correspondingly flows into each separation element. By means of the sample feeding assembly 25, the mixed solution is divided into equal parts flowing into each separation element of the separation assembly 26.

Each separation element of the separation assembly 26 is provided with a circulation cavity through which a mixed solution is circulated. A hydrophilic medium is filled in the circulation cavity. The hydrophilic medium is a glass fiber, a polymer fiber or a mixture thereof and contains at least one of a hydroxyl group, an amide group, an amino group and a carboxyl group. For example, the hydrophilic medium is a glass fiber linked with hydroxyl groups. The hydrophilic medium has a polar group, and thus has relatively high affinity for water.

When the refining apparatus provided in this embodiment is used for refining polyether polyol, the procedure is as follows: Firstly, an acid solution, such as a phosphoric acid solution, is introduced into the neutralization kettle through the first fluid sample inlet 11 provided in the neutralization kettle, and a crude polyether polyol is introduced into the neutralization kettle through the second fluid sample inlet 12 formed in the neutralization kettle. In the mixing inner cavity 13 of the neutralization kettle, the acid solution and the crude polyether polyol are stirred and mixed well to carry out neutralization treatment on the crude polyether polyol, so that the catalyst remaining in the crude polyether polyol is dissolved, in the form of alkali or alkaline earth metal ions, in water and is dispersed in the form of droplets in the polyether polyol, obtaining a mixed solution containing the crude polyether polyol.

Then, the mixed solution flows out of the sample outlet 14 at the bottom of the neutralization kettle and flows to the salt removal device through the connecting pipeline 4. When flowing through the pressurizing pump, the mixed solution passes through the input end of the pressurizing pump in the pipeline 4 and then passes through the output end, and the pressurizing pump pressurizes the liquid in the pipeline 4, so that the mixed solution continues to be conveyed from the pressurizing pump to the salt removal device.

The mixed solution is conveyed to the salt removal device via the pipeline 4, and flows into the separation inner cavity 24 of the salt removal device through the mixed solution inlet 21 formed on the vertical side wall of the salt removal device. In the separation inner cavity 24, the mixed solution flows into the sample feeding tubes of the sample feeding assembly 25 so that the mixed solution is divided into equal parts flowing into the separation elements communicated with the sample feeding tubes in an one-to-one correspondence manner. In the process of circulating the mixed solution in the circulation cavity of the separation elements, the mixed solution flows through the hydrophilic medium, and due to the hydrophilicity of the hydrophilic medium, the polyether polyol in the mixed solution flows out first after flowing through the hydrophilic medium and is gathered to form a second density phase liquid; and at the same time, the aqueous phase droplets in the mixed solution are contacted with the hydrophilic medium and are adsorbed on the surface of the hydrophilic medium and continuously collect on the surface of the hydrophilic medium, and after a certain volume is reached, the aqueous phase droplets are separated from the hydrophilic medium under the action of gravity, so as to form a first density phase liquid.

The density of the first density phase liquid is greater than that of the second density phase liquid because alkali metal ions and/or alkaline earth metal ions are dissolved in the first density phase liquid. After settling for a period of time, the first density phase liquid is converged below the second density phase liquid and flows out of the separation inner cavity 24 through the first density phase outlet 23 formed in the bottom wall of the salt removal device; The second density phase liquid has a smaller density and thus flows out of the separation inner cavity 24 through the second density phase outlet 22 formed in the top wall of the salt removal device. In this way, alkali metal ions and alkaline earth metal ions and water in the polyether polyol are removed simultaneously, and a refined polyether polyol is obtained.

By using the refining apparatus as described above, residual catalyst metal ions and moisture in the polyether polyol can be removed at the same time, so the refining process of polyether polyol is simplified, and the refining efficiency of the polyether polyol is improved. The obtained polyether polyol has low total aldehyde content (less than or equal to 3 ppm), small odor and high environmental friendliness. The alkali metal ions in the polyether polyol are effectively removed, so the obtained refined polyether polyol can be directly used for synthesizing polyurethane products, and side reactions in the synthesis process of the polyurethane products can be reduced, and the quality of the synthesized polyurethane products is improved.

As a first variation of this embodiment, the pressurizing pump arranged on the pipeline 4 which communicatively connects the neutralization kettle with the salt removal device may also be replaced by other pressurizing unit 3 such as a peristaltic pump or a diaphragm pump which has a pressurizing function on the pipeline 4, As a second variation of the present embodiment, no pressurization unit 3 is provided on the pipeline 4 communicating the mixing unit 1 and the separating unit 2. A high-pressure inert gas such as nitrogen is introduced into the neutralization kettle instead of the pressurizing unit 3 to increase the pressure in the reaction kettle and thus increase the pressure of the mixed solution flowing into the pipeline 4 from the sample outlet 14 of the reaction kettle, so that the mixed solution is conveyed to the separating unit 2, and a certain pressure is still reserved after flowing into the salt removal device.

As a third variation of the present embodiment, the separation elements may also be provided in other shapes, for example, sheet-like, so long as each of the separation elements has a separation inner cavity 24 filled with a hydrophilic medium, so that the refining process of polyether polyol can be carried out in the separation inner cavity 24. As a further variation, the hydrophilic medium may also be a glass fiber, a polymer fiber or a mixture thereof that contains other hydrophilic groups such as an amide group, an amino group or a carboxyl group, or the like. As a further variation, the hydrophilic medium can also contain two or more hydrophilic groups, as long as the hydrophilic medium can have good hydrophilic performance and can adsorb the aqueous phase droplets.

As a fourth variation of the present embodiment, water can also be introduced into the mixing inner cavity 13 through the second fluid sample inlet 12 of the neutralization kettle to dilute the crude polyether polyol and dissolve alkaline metal ions in the crude polyether polyol, and then subsequent refining process is carried out.

Embodiment 2

Figure 2:
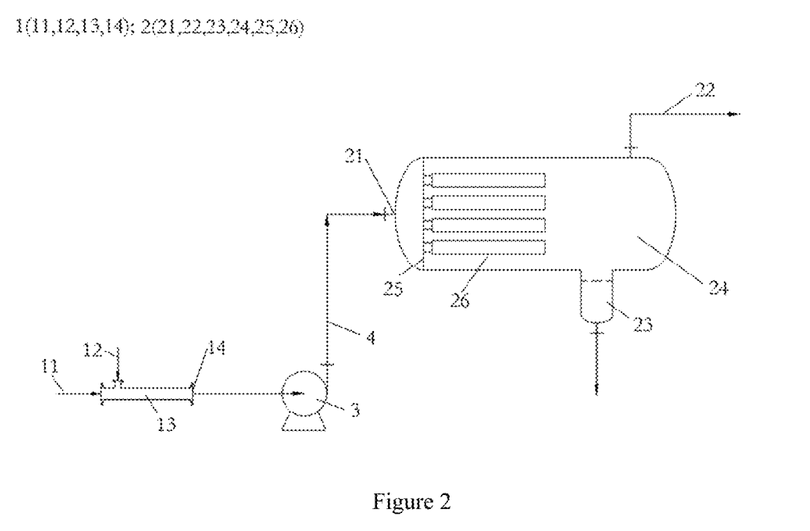
FIG. 2 is a schematic structural diagram of a refining apparatus of polyether polyol provided in a second embodiment of the present invention.

Compared with the refining apparatus provided in embodiment 1, the refining apparatus provided in this embodiment differs in the following:

As shown in FIG. 2, the mixing unit 1 is a pipeline mixer having two openings in the axial direction. One opening is a first fluid sample inlet 11 and the other opening is a sample outlet 14. A second fluid sample inlet 12 is formed in the side wall of the pipeline mixer, and a mixing inner cavity 13 is provided inside the pipeline mixer. The crude polyether polyol flows into the pipeline mixer through the first fluid sample inlet 11, and the acid solution flows into the pipeline mixer though the second fluid sample inlet 12, so that neutralization treatment is carried out in the mixing inner cavity 13, and the obtained mixed solution flows out of the pipeline mixer through the sample outlet 14 and continues to be conveyed to the separating unit 2.

Embodiment 3

Figure 3:
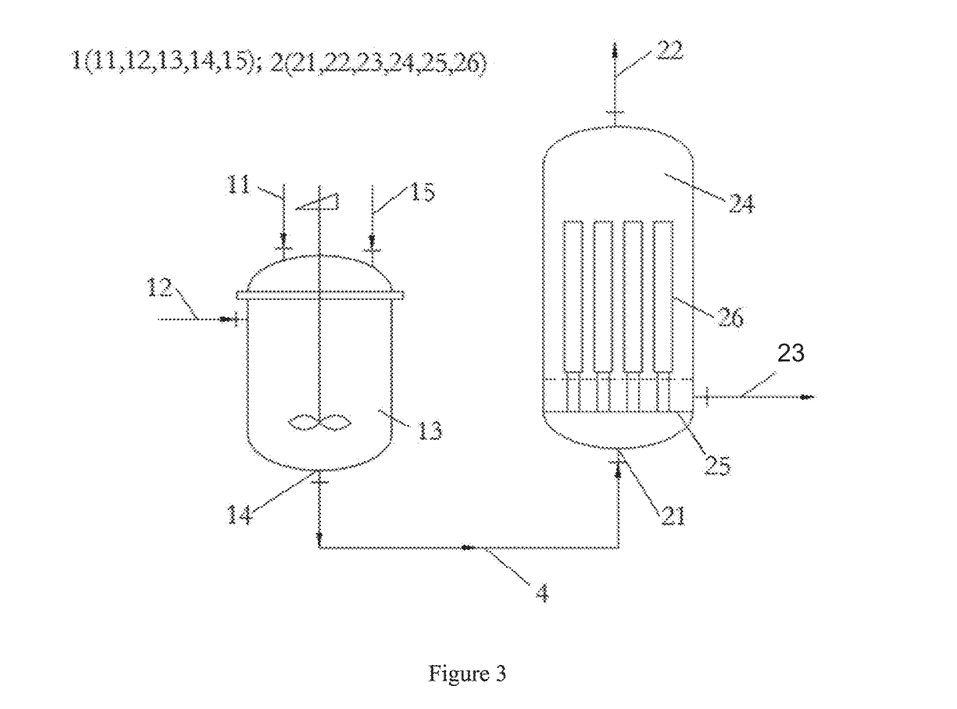
FIG. 3 is a schematic structural diagram of a refining apparatus of polyether polyol provided in a third embodiment of the present invention.

Compared with the refining apparatus provided in the embodiment 1, the refining apparatus provided in this embodiment differs in the following:

As shown in FIG. 3, the mixed solution inlet 21 of the salt removal device is arranged on the bottom wall of the salt removal device, the first density phase outlet 23 is formed on the vertical side wall of the salt removal device, and the second density phase outlet is formed in the top wall of the salt removal device. The mixed solution flows into the separation inner cavity 24 of the salt removal device from the inlet at the bottom, and flows through the sample feeding assembly 25 which divides the mixed solution into equal parts flowing into the separation elements, so as to perform aggregation and separation processes of the first density phase liquid and the second density phase liquid in the separation elements. The first density phase liquid contains alkaline metal ions and has a greater density, so after settling, the first density phase liquid flows out of the first density phase outlet 23 on the side wall, and the second density phase liquid is a polyether polyol having a smaller density and is discharged from a second density phase outlet 22 at the top to obtain a refined polyether polyol.

No pressurizing unit 3 is provided between the mixing unit 1 and the separating unit 2. That is, no pressurizing pump is arranged on the pipeline 4 which communicatively connects the pipeline mixer with the salt removal device. Instead, a gas feed inlet 15 is formed in the top wall of the neutralization kettle, and a high-pressure inert gas is introduced into the neutralization kettle through the gas feed inlet 15 to increase the pressure in the neutralization kettle and thus increase the pressure of the mixed solution flowing into the pipeline 4 from the sample outlet 14 of the reaction kettle, so that the mixed solution is conveyed to the separating unit 2, and a certain pressure is still reserved after flowing into the salt removal device.

Embodiment 4

Figure 4:
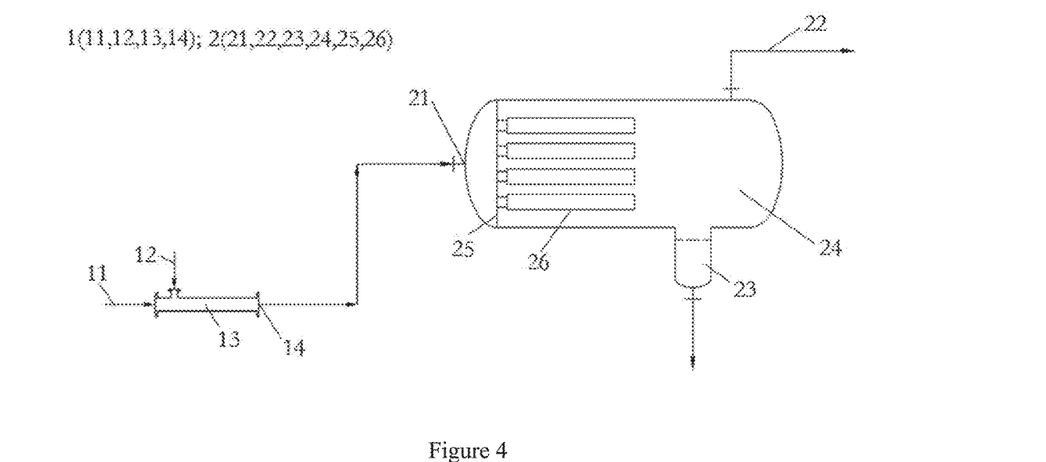
FIG. 4 is a schematic structural diagram of a refining apparatus of polyether polyol provided in a fourth embodiment of the present invention.

Compared with the refining apparatus provided in the embodiment 2, the refining apparatus provided in this embodiment differs in the following:

As shown in FIG. 4, no pressurizing unit 3 is provided between the mixing unit 1 and the separating unit 2. That is, no pressurizing pump is arranged on the pipeline 4 which communicatively connects the pipeline mixer with the salt removal device. Instead, the pipeline 4 is communicated to the mixed solution inlet 21 of the salt removal device through the sample outlet 14 of the pipeline mixer. In actual use, the relative positions of the pipeline mixer and the salt removal device can be arranged, so that the mixed solution flowing out of the sample outlet 14 of the pipeline mixer can be smoothly conveyed to the salt removal device under the action of gravity, and a certain pressure can be maintained after entering the salt removal device.

As a variation, the mixing unit 1 can also be a neutralization kettle, and the position of the neutralization kettle and the salt removal device can be set, so that the mixed solution flowing out of the neutralization kettle can be smoothly conveyed to the salt removal device.

Embodiment 5

Figure 5:
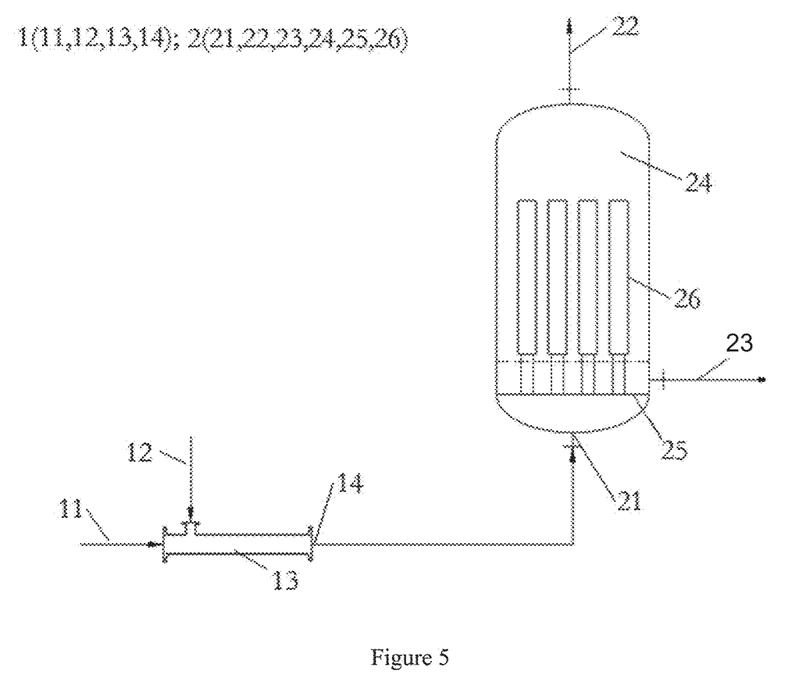
FIG. 5 is a schematic structural diagram of a refining apparatus of polyether polyol provided in a fifth embodiment of the present invention.

Compared with the refining apparatus provided in the embodiment 4, the refining apparatus provided in this embodiment differs in the following:

As shown in FIG. 5, the mixed solution inlet 21 of the salt removal device is arranged on the bottom wall of the salt removal device, the first density phase outlet 23 is formed on the vertical side wall of the salt removal device, and the second density phase outlet is formed in the top wall of the salt removal device. The relative positions of the pipeline mixer and the salt removal device are arranged such that the mixed solution flowing out of the sample outlet 14 of the pipeline mixer can be smoothly conveyed to the salt removal device under the action of gravity, and a certain pressure is maintained after entering the salt removal device. The first density phase liquid and the second density phase liquid are then separated in the salt removal device and discharged from the first density phase outlet 23 and the second density phase outlet 22, respectively, so that the refining process of the polyether polyol is realized.

As a variation, the mixing unit 1 can also be a neutralization kettle, and the position of the neutralization kettle and the salt removal device can be arranged, so that the mixed solution flowing out of the neutralization kettle can be smoothly conveyed to the salt removal device, and a certain pressure is kept after entering the salt removal device.

Embodiment 6

Figure 6:
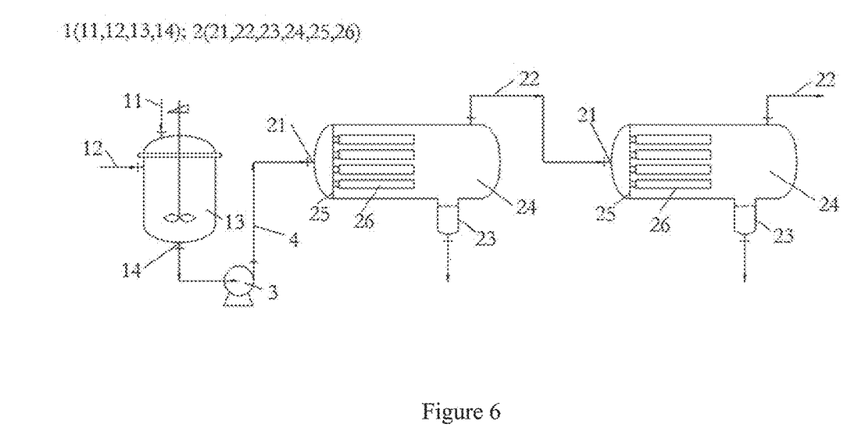
FIG. 6 is a schematic structural diagram of a refining apparatus of polyether polyol provided in a sixth embodiment of the present invention.

Compared with the refining apparatus provided in the embodiment 1, the refining apparatus provided in this embodiment differs in the following:

As shown in FIG. 6, the separating unit 2 comprises two salt removal devices which are sequentially connected in series. In order to facilitate the expression, the salt removal device adjacent to the mixing unit 1 is named as a first salt removal device, and the salt removal device remote from the mixing unit 1 is named as a second salt removal device. The second density phase outlet 22 of the first salt removal device is communicated to the mixed solution inlet 21 of the second salt removal device through a pipeline 4. The polyether polyol refined by the first salt removal device is conveyed to the second salt removal device via a pipeline 4 for performing a second refining process. According to the refining apparatus for the polyether polyol provided in this embodiment, alkaline metal ions and moisture in the polyether polyol are separated twice, so the purity of the polyether polyol is further improved and the refining effect is better. Therefore, the refining apparatus is suitable for the field of high requirements on polyether polyol quality.

As a variation, the number of the salt removal devices can also be 3, 4, and the like, depending on the required purity standard of the polyether polyol.

Embodiment 7

Provided is a refining method for polyether polyol, which is carried out using the refining apparatus of embodiment 1. The refining method comprises the following steps:

(1) 10 tons of crude polyether polyol, having a molecular weight of 4800 and containing potassium hydroxide at a content of 2000 mg/kg, and 47 kg of 75 wt % phosphoric acid solution are introduced into the neutralization kettle and stirred for 1 h, then the neutralization kettle is controlled to a temperature of 60° C. to perform neutralizing treatment on the crude polyether polyol, so that the potassium ions in the polyether polyol are dissolved in water and dispersed in the form of aqueous phase droplets in the polyether polyol.

(2) After the neutralizing treatment is completed, a mixed solution containing polyether polyol is obtained. The mixed solution has a pH value of 5.5, a temperature of 60° C., and a water content of 5% by mass. The mixed solution flows through the pressurizing pump to be pressurized, so that the pressure of the mixed solution is increased to 0.5 MPa.

The mixed solution is then introduced into the salt removal device, and flows through the hydrophilic medium filled in the separation elements. Due to the hydrophilicity of the medium, polyether polyol in the mixed solution flows out first after flowing through the hydrophilic medium and is gathered to form a second density phase liquid; and the aqueous phase droplets in the mixed solution are contacted with the hydrophilic medium and adsorbed on the surface of the hydrophilic medium and continuously collect on the surface of the hydrophilic medium along with circulation of the mixed solution, and after a certain volume is reached, the aqueous phase droplets are separated from the hydrophilic medium under the action of gravity and are gathered to form a first density phase liquid.

(3) The first density phase liquid contains potassium ions, so the density of the first density phase liquid is greater than the density of the polyether polyol. After settling for 1 h, the first density phase liquid is converged at the bottom of the salt removal device, realizing separation from the polyether polyol. The first density phase liquid and the polyether polyol are discharged from the first density phase outlet and the second density phase outlet of the salt removal device respectively, obtaining a refined polyether polyol.

The refined polyether polyol is tested to determine the content of metal ions, water content and total aldehyde content, and the result is that: the content of potassium ions is 3.1 mg/kg; the water content is 0.031% by mass; and the total aldehyde content is 1.65 ppm, including formaldehyde 0.86 ppm, acetaldehyde 0.59 ppm and acrolein 0.

Embodiment 8

Provided is a refining method for polyether polyol, which is carried out using the refining apparatus of embodiment 2. The refining method comprises the following steps:

(1) Crude polyether polyol with a flow rate of 5 tons/h and 25 wt % phosphoric acid solution with a flow rate of 72 kg/h are simultaneously introduced into a pipeline mixer; the crude polyether polyol has a molecular weight of 4800 and contains potassium hydroxide at a content of 2050 mg/kg. The temperature in the pipeline mixer is controlled to be 80° C. to perform neutralizing treatment on the crude polyether polyol, so that the potassium ions in the polyether polyol are dissolved in water and dispersed in the form of aqueous phase droplets in the polyether polyol.

(2) After the neutralizing treatment is completed, a mixed solution containing polyether polyol is obtained. The mixed solution has a pH value of 5.5, a temperature of 80° C., and a water content of 5% by mass. The mixed solution flows through the pressurizing pump to be pressurized, so that the pressure of the mixed solution is increased to 0.1 MPa.

The mixed solution is then introduced into the salt removal device, and flows through the hydrophilic medium filled in the separation elements. Due to the hydrophilicity of the medium, polyether polyol in the mixed solution flows out first after flowing through the hydrophilic medium and is gathered to form a second density phase liquid; and the aqueous phase droplets in the mixed solution are contacted with the hydrophilic medium and adsorbed on the surface of the hydrophilic medium and continuously collect on the surface of the hydrophilic medium along with circulation of the mixed solution, and after a certain volume is reached, the aqueous phase droplets are separated from the hydrophilic medium under the action of gravity and are gathered to form a first density phase liquid.

(3) The first density phase liquid contains potassium ions, so the density of the first density phase liquid is greater than the density of the polyether polyol. After settling for 1 h, the first density phase liquid is converged at the bottom of the salt removal device, realizing separation from the polyether polyol. The first density phase liquid and the polyether polyol are discharged from the first density phase outlet and the second density phase outlet of the salt removal device respectively, obtaining a refined polyether polyol.

The refined polyether polyol is tested to determine the content of metal ions, water content and total aldehyde content, and the result is that: the content of potassium ions is 3.06 mg/kg; the water content is 0.032% by mass; and the total aldehyde content is 1.54 ppm, including formaldehyde 0.91 ppm, acetaldehyde 0.63 ppm and acrolein 0.

Embodiment 9

Provided is a refining method for polyether polyol, which is carried out using the refining apparatus of embodiment 3. The refining method comprises the following steps:

(1) 10 tons of crude polyether polyol, having a molecular weight of 4800 and containing potassium hydroxide at a content of 2100 mg/kg, and 75 kg of 50 wt % phosphoric acid solution are introduced into the neutralization kettle and stirred for 1 h, then the neutralization kettle is controlled to a temperature of 80° C. to perform neutralizing treatment on the crude polyether polyol, so that the potassium ions in the polyether polyol are dissolved in water and dispersed in the form of aqueous phase droplets in the polyether polyol.

(2) After the neutralizing treatment is completed, a mixed solution containing polyether polyol is obtained. The mixed solution has a pH value of 5.5, a temperature of 80° C., and a water content of 8% by mass. High-pressure inert gas $N_2$ is introduced into the neutralization kettle through the gas feed inlet to increase the pressure of the mixed solution to 0.5 MPa.

The mixed solution is then introduced into the salt removal device, and flows through the hydrophilic medium filled in the separation elements. Due to the hydrophilicity of the medium, polyether polyol in the mixed solution flows out first after flowing through the hydrophilic medium and is gathered to form a second density phase liquid; and the aqueous phase droplets in the mixed solution are contacted with the hydrophilic medium and adsorbed on the surface of the hydrophilic medium and continuously collect on the surface of the hydrophilic medium along with circulation of the mixed solution, and after a certain volume is reached, the aqueous phase droplets are separated from the hydrophilic medium under the action of gravity and are gathered to form a first density phase liquid.

(3) The first density phase liquid contains potassium ions, so the density of the first density phase liquid is greater than the density of the polyether polyol. After settling for 1 h, the first density phase liquid is converged at the bottom of the salt removal device, realizing separation from the polyether polyol. The first density phase liquid and the polyether polyol are discharged from the first density phase outlet and the second density phase outlet of the salt removal device respectively, obtaining a refined polyether polyol.

The refined polyether polyol is tested to determine the content of metal ions, water content and total aldehyde content, and the result is that: the content of potassium ions is 2.9 mg/kg; the water content is 0.026% by mass; and the total aldehyde content is 1.38 ppm, including formaldehyde 0.85 ppm, acetaldehyde 0.53 ppm and acrolein 0.

Embodiment 10

Provided is a refining method for polyether polyol, which is carried out using the refining apparatus of embodiment 6. The refining method comprises the following steps:

(1) 5 tons of crude polyether polyol, having a molecular weight of 4800 and containing potassium hydroxide at a content of 2150 mg/kg, and 180 kg of 10 wt % phosphoric acid solution are introduced into the neutralization kettle and stirred for 1 h, then the neutralization kettle is controlled to a temperature of 120° C. to perform neutralizing treatment on the crude polyether polyol, so that the potassium ions in the polyether polyol are dissolved in water and dispersed in the form of aqueous phase droplets in the polyether polyol.

(2) After the neutralizing treatment is completed, a mixed solution containing polyether polyol is obtained. The mixed solution has a pH value of 5.5, a temperature of 120° C., and a water content of 10% by mass. The mixed solution flows through the pressurizing pump to be pressurized, so that the pressure of the mixed solution is increased to 2 MPa.

The mixed solution is then introduced into the salt removal device, and flows through the hydrophilic medium filled in the separation elements. Due to the hydrophilicity of the medium, polyether polyol in the mixed solution flows out first after flowing through the hydrophilic medium and is gathered to form a second density phase liquid; and the aqueous phase droplets in the mixed solution are contacted with the hydrophilic medium and adsorbed on the surface of the hydrophilic medium and continuously collect on the surface of the hydrophilic medium along with circulation of the mixed solution, and after a certain volume is reached, the aqueous phase droplets are separated from the hydrophilic medium under the action of gravity and are gathered to form a first density phase liquid.

(3) The first density phase liquid contains potassium ions, so the density of the first density phase liquid is greater than the density of the polyether polyol. After settling for 1 h, the first density phase liquid is converged at the bottom of the salt removal device, realizing separation from the polyether polyol. The first density phase liquid and the polyether polyol are discharged from the first density phase outlet and the second density phase outlet of the salt removal device respectively, obtaining a refined polyether polyol.

The refined polyether polyol is tested to determine the content of metal ions, water content and total aldehyde content, and the result is that: the content of potassium ions is 2 mg/kg; the water content is 0.034% by mass; and the total aldehyde content is 1.31 ppm, including formaldehyde 0.87 ppm, acetaldehyde 0.44 ppm and acrolein 0.

It is obvious that the above-described embodiments are merely illustrative of the examples and are not intended to limit the embodiments. Other different forms of variation or modification can be made on the basis of the above description for those of ordinary skill in the art. All embodiments do not need to be exhaustive. Obvious variations or modifications are within the scope of the present invention.

The invention claimed is:

1. Refining method for polyether polyol, consisting of the following steps:
   (1) neutralizing or diluting crude polyether polyol to obtain a mixed solution containing the crude polyether polyol;
   (2) flowing the mixed solution through a hydrophilic medium to aggregate same into a first density phase liquid and a second density phase liquid, the first density phase liquid being an aqueous solution containing alkaline metal ions and/or alkaline earth metal ions, and the second density phase liquid being polyether polyol; and
   (3) allowing the first density phase liquid to settle and separating same from the second density phase liquid to obtain refined polyether polyol.

2. The refining method according to claim 1, wherein the hydrophilic medium comprises at least one group selected from a hydroxyl group, an amide group, an amino group and a carboxyl group.

3. The refining method according to claim 2, wherein the hydrophilic medium is glass fiber and/or polymer fiber.

4. The refining method according to claim 1, wherein, said neutralizing or diluting crude polyether polyol in the step (1) comprises mixing the crude polyether polyol with an acid solution having a concentration of 0-75 wt %.

5. The refining method according to claim 4, wherein the acid solution is an aqueous solution comprising at least one of phosphoric acid, hydrochloric acid, nitric acid, sulfuric acid, acetic acid, citric acid and salicylic acid.

6. The refining method according to claim 1, wherein in the step (2), the mixed solution flows through the hydrophilic medium at a pressure of 0.1-2 MPa and a temperature of 50-180° C.

7. The refining method according to claim 1, wherein the refining method is carried out using a refining apparatus which comprises
   a mixing unit, provided with a mixing inner cavity and at least two sample inlets and at least one sample outlet, the mixing inner cavity communicating with the outside through said at least two sample inlets and at least one sample outlet; and
   a separating unit, comprising at least one salt removal device in communication with the sample outlet, wherein the salt removal device is provided with
   a separation inner cavity,
   a first density phase outlet and a second density phase outlet which communicatively connect the separation inner cavity with the outside, the second density phase outlet being located above the first density phase outlet, and
   a mixed solution inlet arranged to avoid the first density phase outlet and the second density phase outlet and being communicated with the sample outlet of the mixing unit,
   wherein a sample feeding assembly and a separation assembly are arranged inside the separation inner cavity, the sample feeding assembly being connected with the mixed solution inlet, and the separation assembly being connected with the sample feeding assembly,
   wherein the separation assembly comprises at least two separation elements arranged in parallel and extending in the flow direction of the mixed solution, each of the separation elements comprising a circulation cavity for circulating the mixed solution and a hydrophilic medium filled in the circulation cavity; and wherein the sample feeding assembly is capable of splitting the mixed solution into equal parts flowing into said at least two separation elements.

8. The refining method according to claim 2, wherein in the step, the mixed solution flows through the hydrophilic medium at a pressure of 0.1-2 MPa and a temperature of 50-180° C.

* * * * *